J. PAGE.
STOCKS FOR MILCH COWS.
No. 175,377. Patented March 28, 1876.
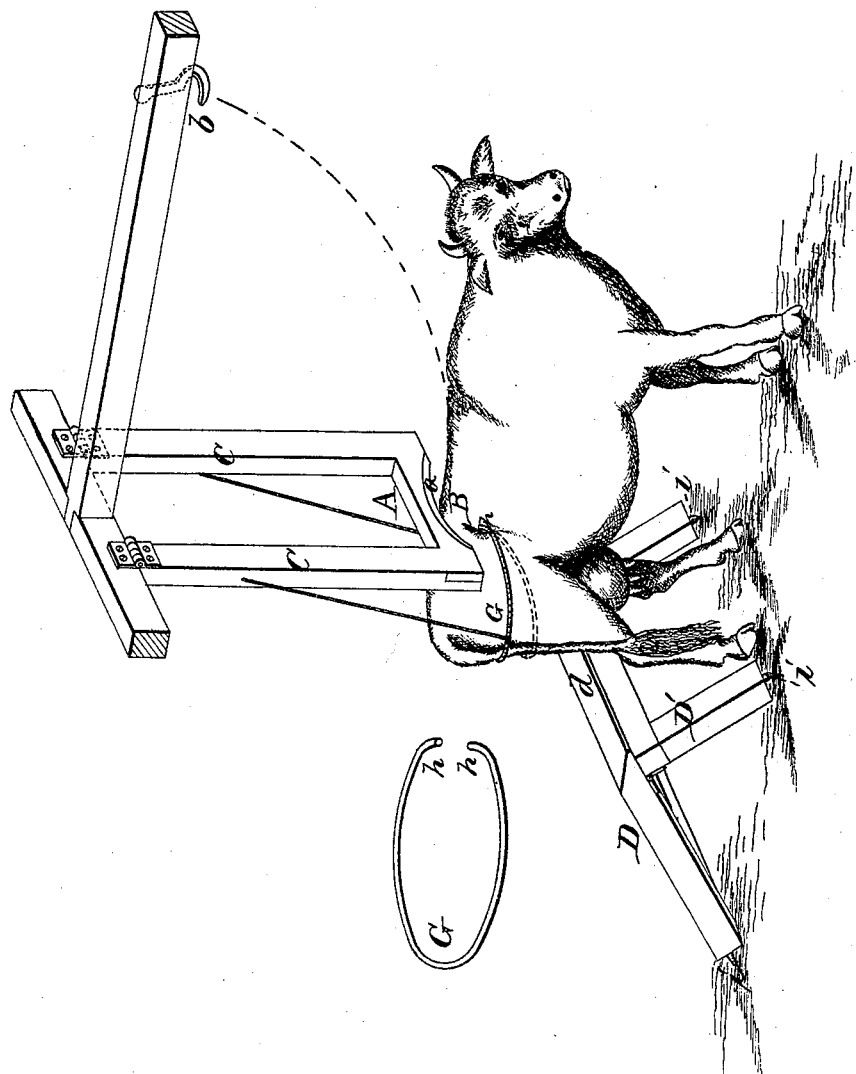
WITNESSES
Franck L. Durand
Henry N. Miller
INVENTOR
Joel Page
By Alexander & Mason
Attorneys.

UNITED STATES PATENT OFFICE.

JOEL PAGE, OF FITCHBURG, MASSACHUSETTS.

IMPROVEMENT IN STOCKS FOR MILCH-COWS.

Specification forming part of Letters Patent No. 175,377, dated March 28, 1876; application filed March 22, 1876.

*To all whom it may concern:*

Be it known that I, JOEL PAGE, of Fitchburg, in the county of Worcester and in the State of Massachusetts, have invented certain new and useful Improvements in Devices for Breaking Cows; and do hereby declare that the following is a full, clear, and exact description thereof, reference being had to the accompanying drawings, and to the letters of reference marked thereon, making a part of this specification.

My invention relates to devices for breaking cows, and it consists in the construction and arrangement of certain mechanical means for preventing a cow from kicking, from moving back, and from switching its tail, as will be hereinafter more fully set forth.

In order to enable others skilled in the art to which my invention appertains to make and use the same, I will now proceed to describe its construction and operation, referring to the annexed drawing, which represents a perspective view, showing the application of my invention.

Cows that are not broken have generally three movements or motions when an attempt is made to milk them, namely: to kick, to move backward, and to switch the tail. To prevent these several movements is the object of my invention; and to this end I provide, first, a board, A, having its lower edge cut out in curved form, as shown at B, and this curved portion is beveled so as to form a sharp edge, *a*. This board is attached to suitable hangers C C, which are hinged in any convenient manner at the top of the stall in which the cow is placed, so that when not in use it may be held out of the way by means of a hook, *b*; and when desired for use it can be let down, when the curved part of the board will fit across the small of the back of the cow, the edge *a* coming in contact with the same. This will prevent the cow from kicking, as any movement tending to such will cause the back to be pressed against the edge *a* and hurt the cow sufficiently to make it discontinue such movement. The curve B of the board also prevents the cow from moving sidewise and getting out from under the board.

To prevent the cow from moving backward I use what may be termed a "buck," made of two frames, D D', hinged together as shown, and having points *i* in the under ends of its legs, to be firm in the ground at any angle that it may be placed. The upper bar of the frame D is made beveled to form a sharp edge, *d*, against which the cow will come when backing, and thus be prevented from moving backward.

It will readily be seen that if the cow were allowed to move backward the board A would be of no use, but the buck D D' preventing the backward movement of the cow, the board will prevent the cow from kicking.

G represents a wire, bent as shown, having its ends forming inwardly-projecting prongs *h*, which are to be inserted in the depressions in front of the hip-bones of the cow, the main part of the wire passing around the tail and preventing the cow from switching the same, said wire being adjustably suspended from the frame C.

Taken together, these devices form an easy and convenient method of breaking cows.

The buck D D' may be adjusted at any angle desired, according to the size of the cow.

Having thus fully described my invention, what I claim as new, and desire to secure by Letters Patent, is—

1. The board A, provided with the cut-out B, having beveled edge *a*, and attached to hinged hangers C C, substantially as and for the purposes herein set forth.

2. The buck herein described, formed of the frames D D', hinged together, and provided with the points *i* and edge *d*, substantially as and for the purposes herein set forth.

3. As arranged in relation to the parts A B C, the bent wire G, provided with inwardly-projecting ends *h h*, and applied substantially in the manner and for the purposes herein set forth.

In testimony that I claim the foregoing I have hereunto set my hand this 22d day of March, 1876.

JOEL PAGE.

Witnesses:
C. L. EMET,
WILLIAM L. BRAMHALL.